(12) United States Patent
Kuhnle et al.

(10) Patent No.: US 7,178,206 B2
(45) Date of Patent: Feb. 20, 2007

(54) FASTENER ELEMENT FOR CONNECTING A STRUCTURAL PART TO A SUPPORT PART

(75) Inventors: Uwe Kuhnle, Schrozberg (DE); Markus Ferdinand, Donsieders (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 139 days.

(21) Appl. No.: 10/969,939

(22) Filed: Oct. 22, 2004

(65) Prior Publication Data

US 2005/0086773 A1    Apr. 28, 2005

(30) Foreign Application Priority Data

Oct. 23, 2003  (DE)  ................ 103 49 449

(51) Int. Cl.
*E04F 19/02*    (2006.01)
*A44B 21/00*    (2006.01)
*F16B 13/04*    (2006.01)

(52) U.S. Cl. ........................ 24/297; 411/508
(58) Field of Classification Search ............ 24/297, 24/289, 292; 411/508; 403/408.1
See application file for complete search history.

(56) References Cited

U.S. PATENT DOCUMENTS

| | | | | |
|---|---|---|---|---|
| 5,106,223 A | * | 4/1992 | Kraus | 24/297 |
| 5,689,863 A | * | 11/1997 | Sinozaki | 24/297 |
| 5,775,861 A | * | 7/1998 | Leon et al. | 24/297 |
| 6,253,423 B1 | * | 7/2001 | Friedrich et al. | 24/289 |
| 6,264,393 B1 | * | 7/2001 | Kraus | 24/297 |
| 6,615,459 B2 | * | 9/2003 | Sano | 24/297 |
| 2004/0177480 A1 | * | 9/2004 | Kanie | 24/297 |

FOREIGN PATENT DOCUMENTS

| | | |
|---|---|---|
| EP | 0 877 171 | 11/1998 |
| EP | 0 954 459 | 11/1999 |
| GB | 2 316 707 | 3/1998 |

* cited by examiner

*Primary Examiner*—Robert J. Sandy
(74) *Attorney, Agent, or Firm*—Lowe Hauptman & Berner, LLP

(57) ABSTRACT

A fastener element includes a fastener body and a locking part. The body includes a shank having two outer webs interconnected by a transverse web. The outer webs have projections including upper and lower ramp surfaces. The locking part includes an aperture having first and second pairs of opposing edges, and L-shaped holding portions each having a first web portion linked to one of the first opposing edges, and a second web portion extending into the aperture. When the outer webs are introduced into slots between the second opposing edges and the holding portions, the lower ramp surfaces move the holding portions away from each other and the second web portions engage the upper ramp surfaces from above. If the shank is introduced in a fastening hole of a support part while the locking part engages the support part, the holding portions are further pivoted away from each other and the second web portions grip the edge of the fastening hole.

8 Claims, 3 Drawing Sheets

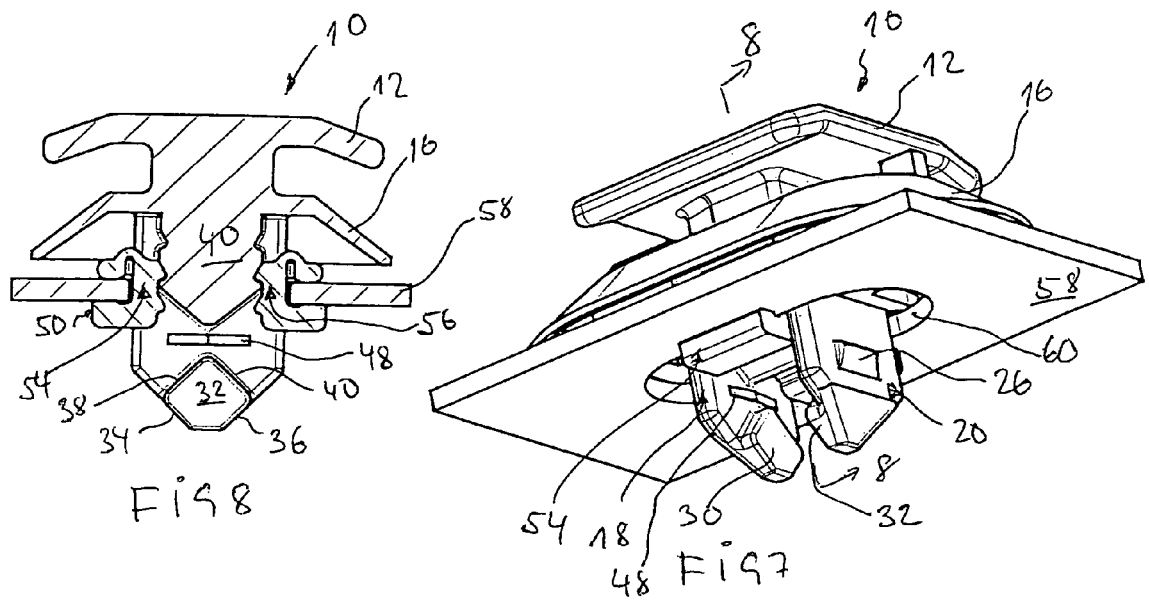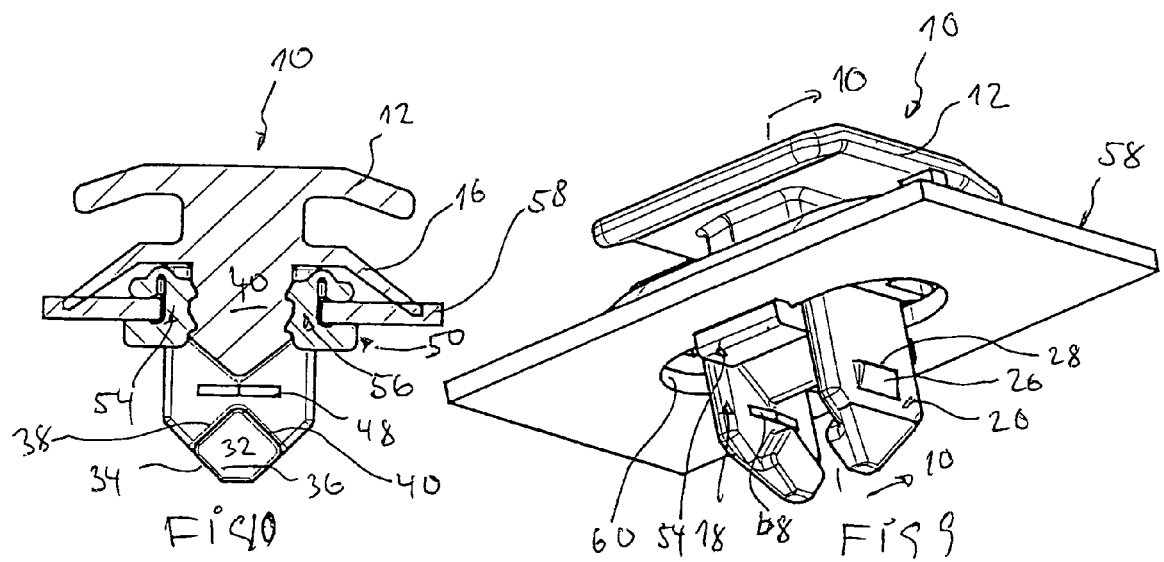

FASTENER ELEMENT FOR CONNECTING A STRUCTURAL PART TO A SUPPORT PART

RELATED APPLICATIONS

The present application is based on, and claims priority from, German Application Number 103 49 449.9, filed Oct. 23, 2003, the disclosure of which is hereby incorporated by reference herein in its entirety.

1. Field of the Invention

The invention relates to a fastener element for connecting a structural part, in particular a lining, to a support part having a fastening hole, in particular a body sheet of an automobile.

2. Background of the Invention

A multiplicity of so-called chips or fastener elements have become known for the fastening of linings and other attachments to the automobile body. The fastener elements, which normally are manufactured from a plastic, have a head for connection to the part to be fastened and a base or shank which is forced into or lockingly inserted into an aperture of the body. The aperture or hole in the body may be of various shapes, e.g. that of a rectangle, elongated hole, circular hole or round hole.

The main requirement to such fastener elements is to ensure large holding forces while assembly forces should be as small as possible. It is often necessary to remove linings or other attachments for repair or maintenance purposes. Therefore, the fastener elements employed at such points require to be disassembled and re-assembled. If possible, the assembly and disassembly forces, even if the elements are repeatedly used, should not depart substantially from the values encountered during their first use.

Installation apertures have sharp edges in most cases and can also present a burr left from punching so that some part of the outer contour of the fastener element is abraded during every assembly and disassembly procedure. This causes the holding forces to weaken and the fastener element to fail, in an extreme case, when the number of assembly cycles increases.

EP 0 954 459 B1 has made known a fastener element for which the problem described is resolved by clipping a two-legged metallic spring onto the shank of a plastic body such that the legs face their free ends slightly outwardly towards the head of the fastener element when the spring is in a stress-relieved state. During an insertion into a fastening hole, the free ends of the spring legs grip behind the hole border. Alternatively, a shoulder may be formed in the spring legs which grips behind the hole border.

SUMMARY OF THE INVENTION

It is the object of the invention to provide a fastener element for connecting a structural part, in particular a lining, to a support part, in particular a body sheet of an automobile, which can be manufactured with little effort and does not cause either corrosion problems or noise.

In the inventive fastener element, as in the known case, two parts are provided, i.e. a fastener body and a washer-like locking part which also is formed from a plastic. The fastener body exhibits two approximately parallel spaced outer webs which are connected by a transverse web at a spacing from the free end of the outer webs. The transverse web stabilizes the outer webs and has a further function reference to which will be made farther below. The transverse web is tapered towards its lower end. On the sides facing each other close to the free end, the outer webs have projections with lower and upper ramp surfaces. The lower ramp surfaces converge towards the free end of the outer webs and the upper ramp surfaces converge towards the head.

The washer-like locking part, which can be of an approximately rectangular shape and has a measure which is larger than the diameter of the fasting hole in any case, has an approximately rectangular aperture or opening. Two opposed sides of the aperture have pivotically formed thereto holding portions each which are approximately L-shaped in the cross-section. Each holding portion has a first web portion formed to the locking part and a second web portion which extends from the upper side of the locking portion to the lower side of the locking portion through the aperture. The dimensions of the aperture and holding portions are such that a slot is formed each between the respective other opposed sides of the aperture and the two holding portions, into which an outer web can be fittingly inserted from the upper side of the locking part in such a way that the lower ramp surfaces of the projections pivot the holding portions away from each other and the lower sides of the second web portions can come to lie on the upper ramp surfaces. In this assembly step, the outer webs are introduced into the slots of the locking part by a certain amount. This helps obtain a pre-assembly position of the parts relative to each other. Shoulders on the outsides of the outer webs can grip under the washer-like locking part at the lower side and secure the locking part against removal from the outer webs of the fastener body.

When the structure described is introduced into the fastening hole after the structural part to be fastened is mounted on the head another pivoting motion of the holding portion occurs because of the interaction of the first web portion with the transverse web. The holding portions, in a stress-relieved state, undergo pivoting by approximately 90° away from the original position, which allows the second web portion to grip under the hole border from the lower side if the shank is introduced sufficiently far into the fastening hole.

The lower end of the transverse web is approximately triangular in cross-section parallel to the outer webs to make it easier to pivot the holding portions as described. There is a spacing which facilitates the engagement of the transverse web between the holding portion in a stress-relieved state. Moreover, a rounded portion may be provided at the outer transition from the first web portion to the second one.

To achieve a sufficient holding force of the inventive fastener element in the fastening hole, another aspect of the invention provides that the surfaces facing each other of the first web portions of the holding portions include at least one locking portion the outside of the transverse web facing them is provided with at least a second locking portion cooperating with the first locking portion. It is preferred to provide two locking teeth or locking gaps spaced in an axial direction where different sheet thicknesses of the support part may be employed. The locking teeth or locking grooves are such as to allow the transverse web to be introduced relatively easily in between the opposed holding portions whereas relatively large holding forces are produced in the opposite direction. However, if sufficient pulling force is applied it is possible to overcome the locked state, which causes the holding elements to fold back to their initial state and to remain there in a position as existed after the pre-assembly. The inventive fastener element can now be used anew.

The inventive fastener element has a number of advantages. There is no wear during the assembly and disassembly. Assembly and disassembly forces are substantially constant. The inventive fastener element allows to precisely harmonize the holding and assembly forces. It is ready possible to mount it in fastening holes even if burr left from punching has remained therein. Furthermore, a relative large tolerance is possible with regard to the size of the fastening hole and the thickness of the support part. The inventive fastener element can be manufactured in a low-expenditure injection molding process. Its use for different hole shapes is also possible.

BRIEF DESCRIPTION OF THE DRAWING

The invention will be described in more detail below with reference to an embodiment shown in the drawings.

FIG. 7 shows a first assembly stage of the fastener element of FIG. 3.

FIG. 8 shows a section through the representation of FIG. 7 taken along lines 8—8.

FIG. 9 shows the final assembly of the fastener element of FIG. 3.

FIG. 10 shows a section through the representation of FIG. 9 taken along lines 9—9.

DETAILED DESCRIPTION OF THE INVENTION

Figure 1:
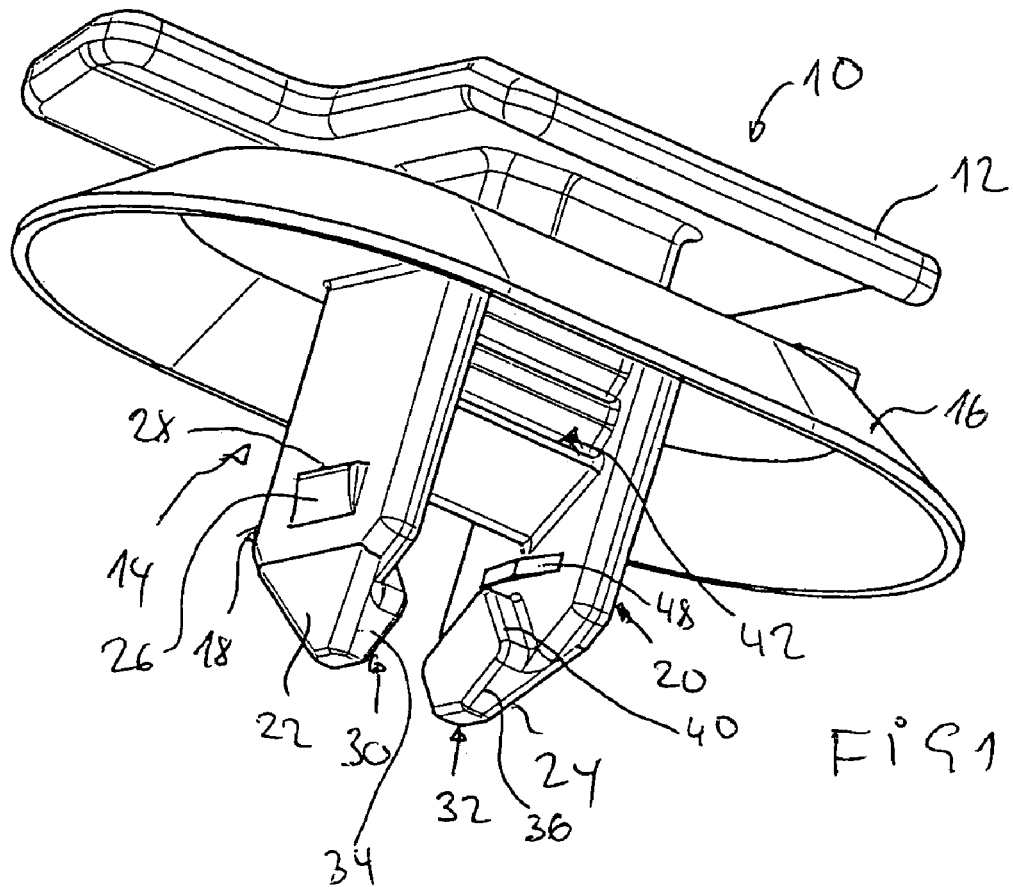
FIG. 1 shows a perspective view of a fastener body of a fastener element according to the invention.

The fastener body 10 shown in FIG. 1 has an elongate head 12 and a shank generally designated 14 which is connected to the head 12 and has two parallel spaced outer webs 18, 20 below an oval, conical sealing flange 16. The outer webs 18, 20 are elongated rectangular in cross-section with the longer sides of the outer webs 18, 20 extending parallel to each other. The outer webs 18, 20 have tapering introduction portions 22, 24 at the free end. On the outer surfaces facing away from each other, the outer webs 18, 20 have elevations one of which is shown at 26. The elevations define a shoulder 26 facing the head 12, reference to which will be made farther below. The outer webs have projections 30, 32 on the inner surfaces facing each other. As can be appreciated from FIG. 4, for example, in which the fastener body 10 is shown in section the projections 30, 32 have lower ramp surfaces 34, 36 which converge downwardly towards the free end of the outer webs 18, 20 and upper ramp surfaces 38, 40 which converge towards the head 12. Reference to the function of the projections 30, 32 will be made farther below. The contour of the projections 30, 32 is rhombic, for example.

Above the projections 30, 32 and below the sealing flange 16, a transverse web 42 which is triangular in section at the free end at 44 and has locking recesses 46 at opposite outer surfaces is extended between the outer webs 18, 20. The transverse web 42 stabilizes the outer webs 18, 20, but has more functions reference to which will be made farther below.

Above the projections 30, 32, the outer webs 18, 20 have ramp-like elevations, one of which is depicted at 48 in FIG. 1, on the sides facing each other. The elevations 48 extending transversely to the longitudinal axis of the outer webs 18, 20 slope down gradually towards the two ends as is clearly apparent from the perspective view of FIG. 1.

Figure 2:
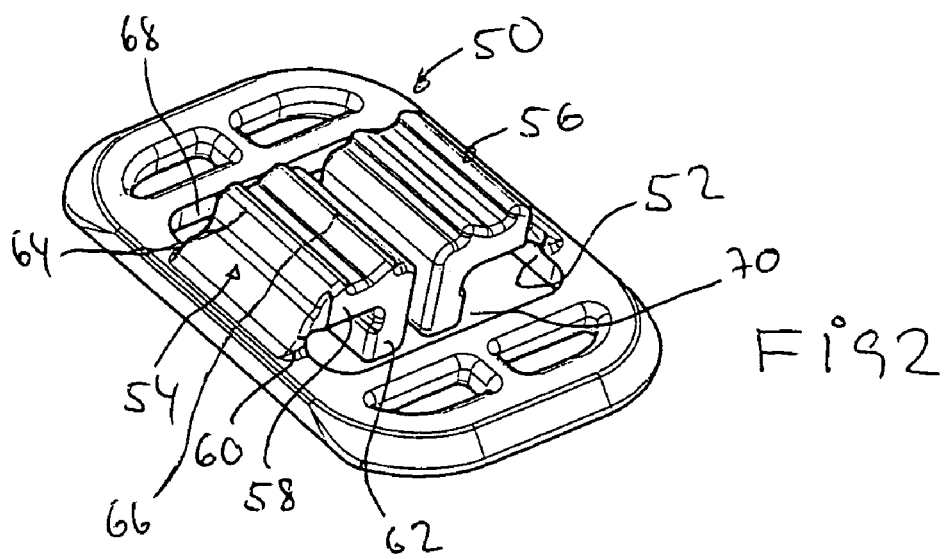
FIG. 2 shows a locking part for the fastener element according to the invention.

In FIG. 2, a washer-like locking part 50 is shown which approximately has a rectangular contour with rounded corners. The washer-like locking part 50 has a rectangular aperture 52. Holding portions 54, 56 extend from two opposed sides of the aperture 52. Each holding portion 54 has a first web portion 58 which is joined to the locking part via a film hinge 60. The rectangular holding portions 54, 56 which are L-shaped in cross-section have a second web portion 62. While the first web portion 58 extends towards the aperture centre approximately in parallel, but outside the plane of the aperture 52 the second web portion 62 extends downwards to the lower side of the locking part 50 from the upper side of the locking part 50 that is recognizable in FIG. 2 through the aperture 52. The side of the first web portion 58 that faces upwards in FIG. 2 has two parallel locking teeth 64, 66.

Slots 68, 70 which are delimited by the surfaces facing each other of the holding portions 54, 56 are formed between the other opposed sides of the aperture 52. The dimensions of the slots 68, 70 are such as to allow the outer webs 18, 20 of the fastener body 10 of FIG. 1 to be introduced and accommodated approximately fittingly therein.

Figure 3:
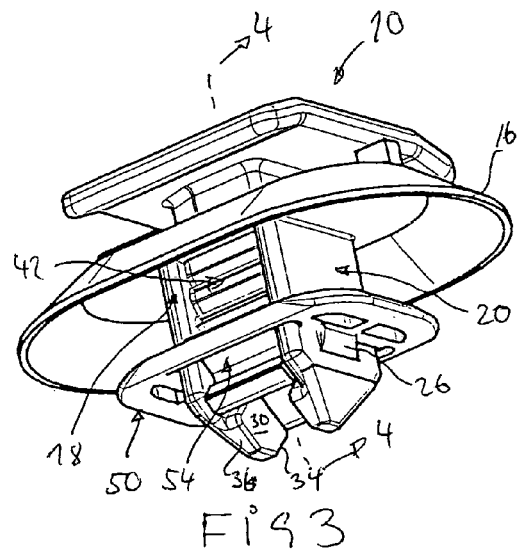
FIG. 3 shows a perspective view of the pre-assembly condition of the fastener body and locking part of FIGS. 1 and 2.
Figure 4:
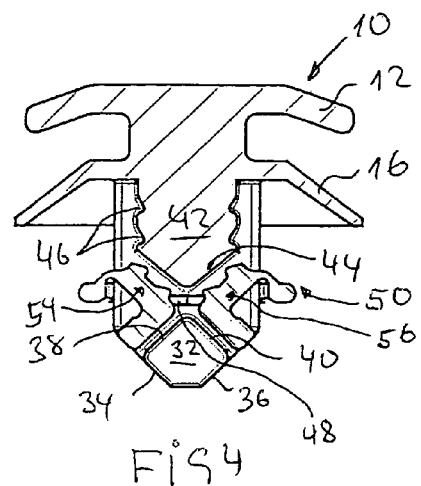
FIG. 4 shows a section through the representation of FIG. 3 taken along lines 4—4.

The procedure described is completed already at a first stage in the representation of FIGS. 3 and 4. What can be appreciated specifically from FIG. 4 is that the holding portions 54, 56 have been pivoted through an angle of approximately 45° across the associated film hinges 60. Such pivoting motion was caused by the fact that the projections 30, 32 pivoted the holding portions 54, 56 downwards and sidewards by means of the ramp surfaces 34, 36. Now that the projections 30, 32 run past the holding portions 54, 56 and their ramp surfaces 34, 36 the holding portions 54, 55 are able to slightly pivot back while engaging the upper ramp surfaces 38, 40 which thus fix the pivoted position of the holding portions 54, 56. While being pivoted, the opposed sides of the holding portions 54, 56 are caused to bear against the ramp-like elevations 48, which produces a certain clamping action. At this point, the shoulders 28 of the elevations 26 of the outer webs 18, 20 grip under the washer-like locking part 50 so as to position it captively on the shank 14.

Figure 6:
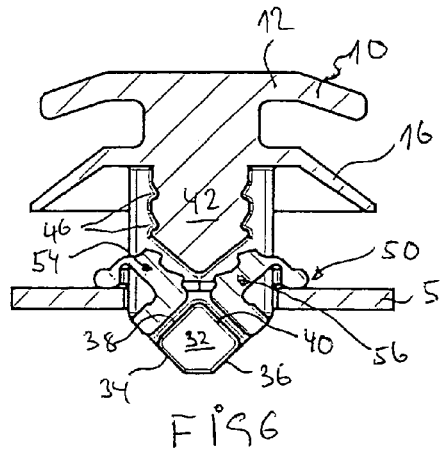
FIG. 6 shows a section through the representation of FIG. 5 taken along lines 6—6.
Figure 5:
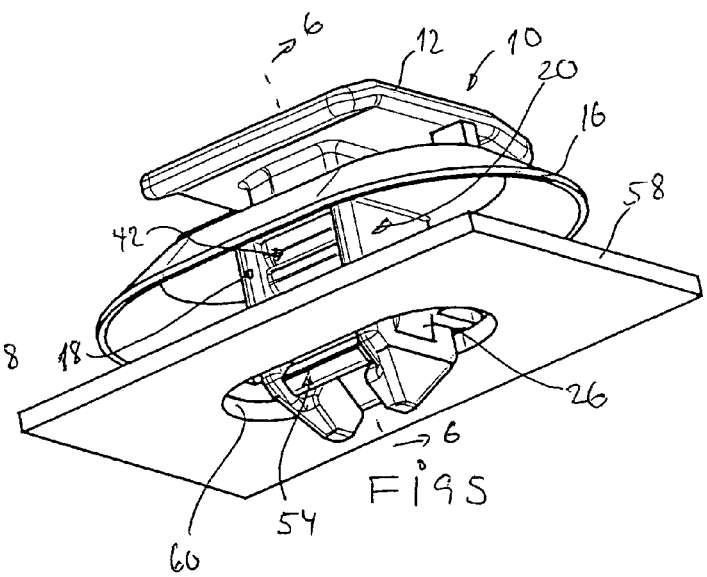
FIG. 5 shows a perspective view of the fastener element of FIG. 3 while being initially inserted into a support part.

In FIGS. 5 and 6, a metal sheet is outlined at 58, which has an oval fastening hole 60. The metal sheet 58 is a support part and forms part of an automobile body, for example. FIGS. 5 and 6 show how the fastener element 10 is introduced into the fastening hole 60 to an extent that the border of the locking part 50 rests on the metal sheet side facing it. Now, when a downward pressure is applied to the head 12 of the fastener body 10 in the position of FIGS. 5 and 6 the outer webs 18, 20 will be farther introduced into the fastening hole 60 and the triangular portion 44 of the transverse web 40 gets into engagement with the side facing it and the sides facing each other of the holding portions 54, 56 while continuing to pivot them farther by approximately further 45°, which now causes the second web portion 62 to grip under the lower side of the metal sheet 58. As is evident from FIG. 6, for example, the first web portions 58 define a triangular introduction opening for the transverse web 40.

The first locking tooth 66 of the holding portions 54, 56 now interengages with the first locking groove or locking gap of the transverse web 40 as can be seen well in FIG. 8. In this way, the fastener element 10 obtains an interlocking in the metal sheet 58. However, it can be seen that the sealing flange 16 still has a spacing from the side facing it of the metal sheet 58 in the position of FIGS. 7 and 8. The fastener body 10 can be forced in even farther as can be recognized in FIGS. 9 and 10. The transverse web 40 continues to move in between the first web portions 58 of the holding portions 54, 66, which causes the second locking tooth 64 of the holding portions 54, 56 to engage the second locking groove of the transverse web 40. In this manner, two locking teeth and two grooves are in engagement with each other on opposed sides each and cause a large holding force of the fastener element shown with the sealing flange now sealingly resting on the metal sheet 58.

Disassembly may be effected by pulling upwards on the fastener body 10, which causes the holding portions 54, 56 to be pivoted back to a position as is shown in FIGS. 4 to 5. In this position, the second web portions 62 release the fastening hole 60, enabling the fastener body 10, along with the locking part 50, to be readily removed from the fastening hole 60. Re-assembly is performed in the way described above.

The invention claimed is:

1. A fastener element for connecting a structural part to a support part having a fastening hole, comprising:
  a fastener body integrally formed of plastic material, the fastener body having a head for the attachment of the structural part, a shank connected to the head, and a sealing flange between the head and the shank; and
  a locking part adapted to be connected to the shank through a releasable snapping connection and having snapping portions which cooperate with an edge of the fastening hole when the shank is introduced in the fastening hole in order to secure the fastener element on the support part;
  wherein the shank has two approximately parallel spaced outer webs which are interconnected by a transverse web;
    the transverse web being spaced from free ends of the outer webs, and having a tapered portion tapering to a lower end thereof;
    the outer webs each having a surface, the surfaces facing each other, and each said surface having thereon a projection adjacent to the free end of the respective outer web, said projection including upper and lower ramp surfaces;
    the lower ramp surfaces converging to the free end of the respective outer web and the upper ramp surfaces converging towards the head;
  wherein said locking part is formed of plastic material and comprises
    an approximately rectangular aperture having first and second pairs of opposing edges; and
    holding portions approximately L-shaped in cross-section and being linked to the opposing edges of the first pair, respectively;
    each of the holding portions having a first web portion which is linked to the respective one of the opposing edges of the first pair, and a second web portion which extends from an upper side of the locking part into the aperture towards a lower side of the locking part;
  wherein
    a slot is formed between each of the opposing edges of the second pair and both said holding portions, each said slot being adapted to accommodate the respective one of said outer webs which is approximately matched to the slot;
    when the outer webs of the shank are introduced into the respective slots from the upper side of the locking part, the lower ramp surfaces of the projections move the holding portions away from each other and lower sides of the second web portions engage the upper ramp surfaces from above; and
    the lower end of the transverse web and associated facing surfaces of the first web portions of the holding portions are formed such that, if the shank is introduced in the fastening hole while the locking part engages the support part, the holding portions are further pivoted away from each other and the second web portions grip the edge of the fastening hole.

2. The fastener element of claim 1, wherein the lower end of the transverse web is approximately triangular in a cross-section parallel to the outer webs.

3. The fastener element of claim 1, wherein the facing surfaces of the first web portions of the holding portions include at least a locking portion and surfaces of the transverse web facing the holding portions have a second locking portion cooperating with the first locking portion.

4. The fastener element of claim 3, wherein the first locking portion has two locking teeth and the second locking portion has two locking grooves or vice versa.

5. The fastener element of claim 1, wherein the outer webs further comprise, on surfaces other than the facing surfaces, shoulders facing outwardly;
  the shoulders engaging the lower side of the locking part if the locking part is pushed onto the outer webs for pre-mounting purposes.

6. The fastener element of claim 1, wherein each of the outer webs has an introduction tip at the free end thereof.

7. The fastener element of claim 1, wherein the outer webs on the facing surfaces on the end adjacent to the head of the fastener body each have ramp-shaped elevations extending transverse to an axis of the outer webs, a highest point of each said elevation being between the ends of the elevation while the elevation sloping down on both sides of the highest point.

8. The fastener element of claim 1, wherein the outer webs are approximately elongated and rectangular in cross-section and have rounded edges.

* * * * *